(12) United States Patent
Schwindt et al.

(10) Patent No.: US 8,791,802 B2
(45) Date of Patent: Jul. 29, 2014

(54) DRIVER ASSISTANCE SYSTEM FOR REDUCING BLIND-SPOT-DETECTION FALSE ALERTS

(75) Inventors: Oliver Schwindt, Novi, MI (US); Maria Eugenia Garcia Bordes, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 332 days.

(21) Appl. No.: 13/228,861

(22) Filed: Sep. 9, 2011

(65) Prior Publication Data

US 2013/0063257 A1    Mar. 14, 2013

(51) Int. Cl.
| | |
|---|---|
| *B60Q 1/00* | (2006.01) |
| *G08G 1/16* | (2006.01) |
| *G08G 1/01* | (2006.01) |
| *B60R 22/00* | (2006.01) |
| *G06G 7/70* | (2006.01) |
| *G06F 17/10* | (2006.01) |

(52) U.S. Cl.
USPC ........ 340/435; 340/425.5; 340/903; 340/935; 340/936; 701/45; 701/117; 701/301

(58) Field of Classification Search
USPC ..................................................... 340/425.5
See application file for complete search history.

(56) References Cited

U.S. PATENT DOCUMENTS

| | | | |
|---|---|---|---|
| 5,517,196 A * | 5/1996 | Pakett et al. .................. 342/70 |
| 5,521,579 A | 5/1996 | Bernhard | |
| 6,151,639 A | 11/2000 | Tucker et al. | |
| 6,429,789 B1 * | 8/2002 | Kiridena et al. ............... 340/905 |
| 6,680,689 B1 | 1/2004 | Zoratti | |
| 7,009,500 B2 | 3/2006 | Rao et al. | |
| 7,355,524 B2 | 4/2008 | Schofield | |
| 8,040,227 B2 * | 10/2011 | Friedrichs et al. ............ 340/436 |
| 8,527,151 B2 * | 9/2013 | Le et al. ......................... 701/45 |
| 2010/0117813 A1 | 5/2010 | Lee | |
| 2012/0041632 A1 * | 2/2012 | Garcia Bordes ............. 701/29.1 |

FOREIGN PATENT DOCUMENTS

EP    1958840    8/2008

OTHER PUBLICATIONS

International Search Report and Written Opinion for Application No. PCT/US2012/054149 dated Dec. 5, 2012 (16 pages).

\* cited by examiner

*Primary Examiner* — Jennifer Mehmood
*Assistant Examiner* — John Mortell
(74) *Attorney, Agent, or Firm* — Michael Best & Friedrich LLP

(57) ABSTRACT

A system for detecting objects in the blind spot of a host vehicle. When an object is detected in the blind spot of the host vehicle, the system analyzes other objects directly in front of or behind the detected object in the blind spot. If the other objects are moving, the system concludes that the object in the blind spot is also moving and, therefore, is a stagnating vehicle. If the other objects are not moving, the system concludes that the object in the blind spot is also a stationary object. The system generates a blind-spot-detection signal when it determines that a stagnating vehicle is located in the blind spot.

10 Claims, 5 Drawing Sheets

DRIVER ASSISTANCE SYSTEM FOR REDUCING BLIND-SPOT-DETECTION FALSE ALERTS

BACKGROUND

Driver assistance systems include rear safety functions such as blind spot detection (BSD), lane change assist (LCA), and cross traffic alert (CTA). These systems are generally based on a single type of detection technology such as radar, ultrasound, or video.

SUMMARY

Existing blind spot detection systems may have difficulty differentiating between a stagnating vehicle and a stationary object. A stagnating vehicle is one that is moving at almost the same speed as the host vehicle and remaining in the blind spot of the host vehicle. A BSD warning should be triggered when a stagnating vehicle is detected, but should not be triggered by a stationary object, e.g. a guardrail, a concrete barrier, or a utility pole. Failure to distinguish between these two limits the effectiveness of the BSD system and leads a driver to mistrust warnings produced by the system.

In one embodiment, the invention provides a system for detecting objects in the blind spot of a host vehicle. When an object is detected in the blind spot of the host vehicle, the system analyzes other objects in the same lane as the detected object, determines the relative speed of the other objects, and, based on the relative speed, determines whether there is moving traffic on the neighboring lane and consequently determines if the object in the Blind Spot is moving or stationary. If the other objects are stationary, the system determines that the object in the blind spot of the host vehicle is also stationary and does not trigger a blind-spot-detection signal. However, if the other objects are moving, i.e. not stationary, the system determines that the object in the blind spot of the host vehicle is also moving and triggers a blind-spot-detection signal.

In some embodiments, the one or more sensors include at least one of a radar sensor, a video camera, and an ultrasound sensor. In some embodiments, the system includes a first radar sensor positioned to monitor the blind spot of the host vehicle and a second sensor to monitor an area outside of the blind spot. The second sensor includes one of a video camera, an ultrasound sensor, and a second radar sensor. In some embodiments, the area outside of the blind spot that is monitored by the second sensor includes at least one of an area adjacent to the side of the host vehicle, an area in front of the host vehicle, and an area behind the blind spot of the host vehicle.

In other embodiment, the invention provides a system for detecting objects in the blind spot of a host vehicle. When an object is detected, the system attempts to calculate the actual speed of the detected object based on the speed of the object relative to the host vehicle. If the actual speed of the object is greater than a threshold, the system determines that a moving vehicle is locating in the blind spot of the host vehicle and triggers a blind-spot-detection signal. If the actual speed of the object is less than the threshold, the system determines that the object is stationary and does not trigger the blind-spot detection signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Most vehicles include one or more blind spots typically located on the sides behind the B-column—usually near the rear corners of the vehicle. Changing lanes can be particularly hazardous when another vehicle is continuously operating in the blind spot of the vehicle in an adjacent lane. These vehicles are referred to herein as stagnating vehicles, because they are operating near the same speed as the host vehicle and, therefore, neither overtake the host vehicle nor are overtaken. The system described below detects stagnating vehicles and generates a signal that alerts the driver to the presence of the vehicle or provides an input to another vehicle system such as a lane change assist system. Furthermore, the system is able to distinguish between stagnating vehicles operating in the blind spot and stationary objects (such as guard rails or concrete barriers) that are passing through the blind spot. The warning signal is not generated when a stationary object passes through the blind spot.

Figure 1:
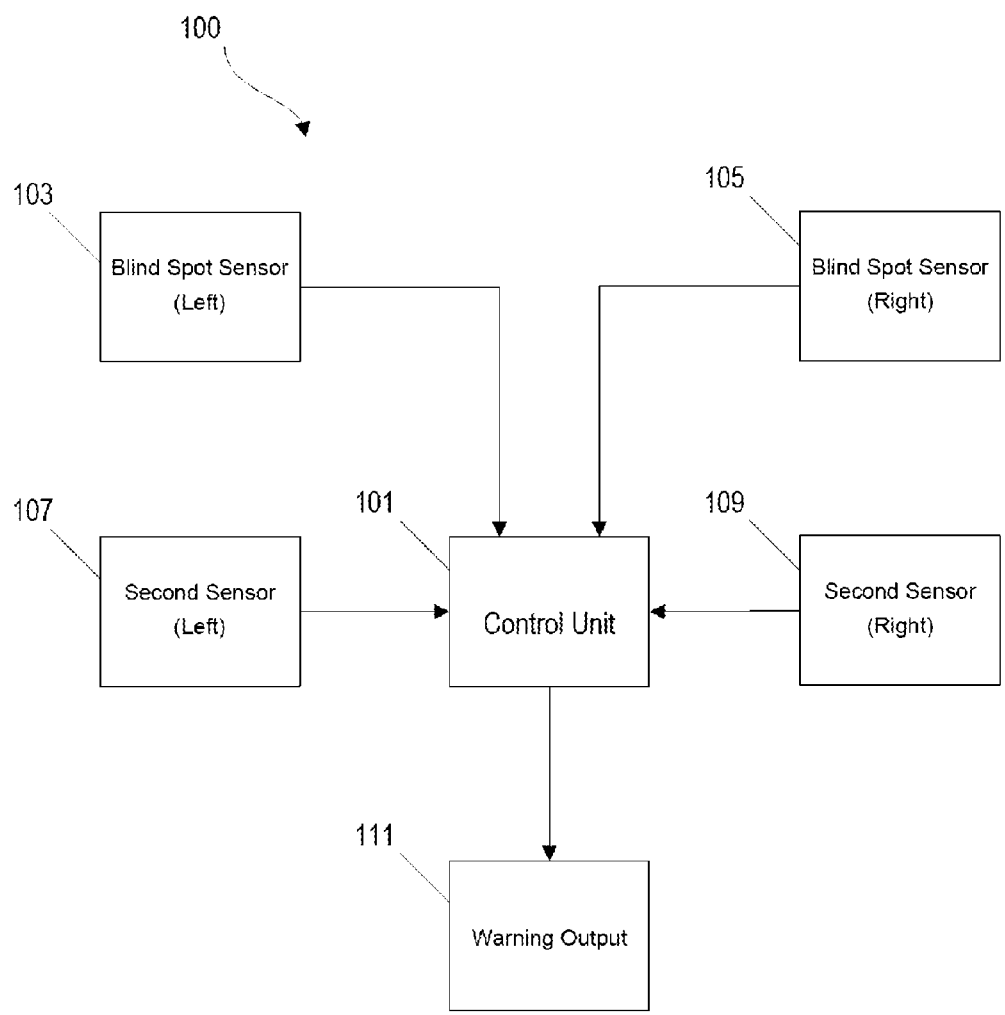
FIG. 1 is a block diagram of a driver assistance system according to one embodiment.

FIG. 1 illustrates a driver's assistance system 100 that is capable of detecting objects in the blind spot of a host vehicle. The system includes a control unit 101 that receives input signals from one or more sensors. The control unit 101 in this example includes a processor and a memory storing executable instructions. However, in other embodiments, the control unit may be implemented in other way. In the system of FIG. 1, the control unit 101 receives input signals from a left blind spot sensor 103, a right blind spot sensor 105, a second left sensor 107, and a second right sensor 109. The control unit 101 analyzes data from the various sensors to detect objects operating in one of the blind spots of a host vehicle and determine whether the object is a stagnating vehicle or a stationary object. When the control unit 101 determines that a stagnating vehicle is located in the blind spot of the host vehicle, a signal is generated and sent to a warning output 111. In some embodiments, the warning output is a visual or auditory output that provides an indication to the driver of the host vehicle that a stagnating vehicle is located in the blind spot. The visual or auditory output may also indicate the blind spot in which the stagnating vehicle is located.

In the illustrated example, the sensors 103, 105, 107, and 109 are radar sensors. However, in other constructions, the sensors 103, 105, 107, and 109 may include various other sensors including video camera systems, ultrasound sensor, or combinations thereof. For example, the blind spot sensors 103 and 105 may be radar sensors while the additional sensors 107 and 109 are video camera systems.

Figure 2:
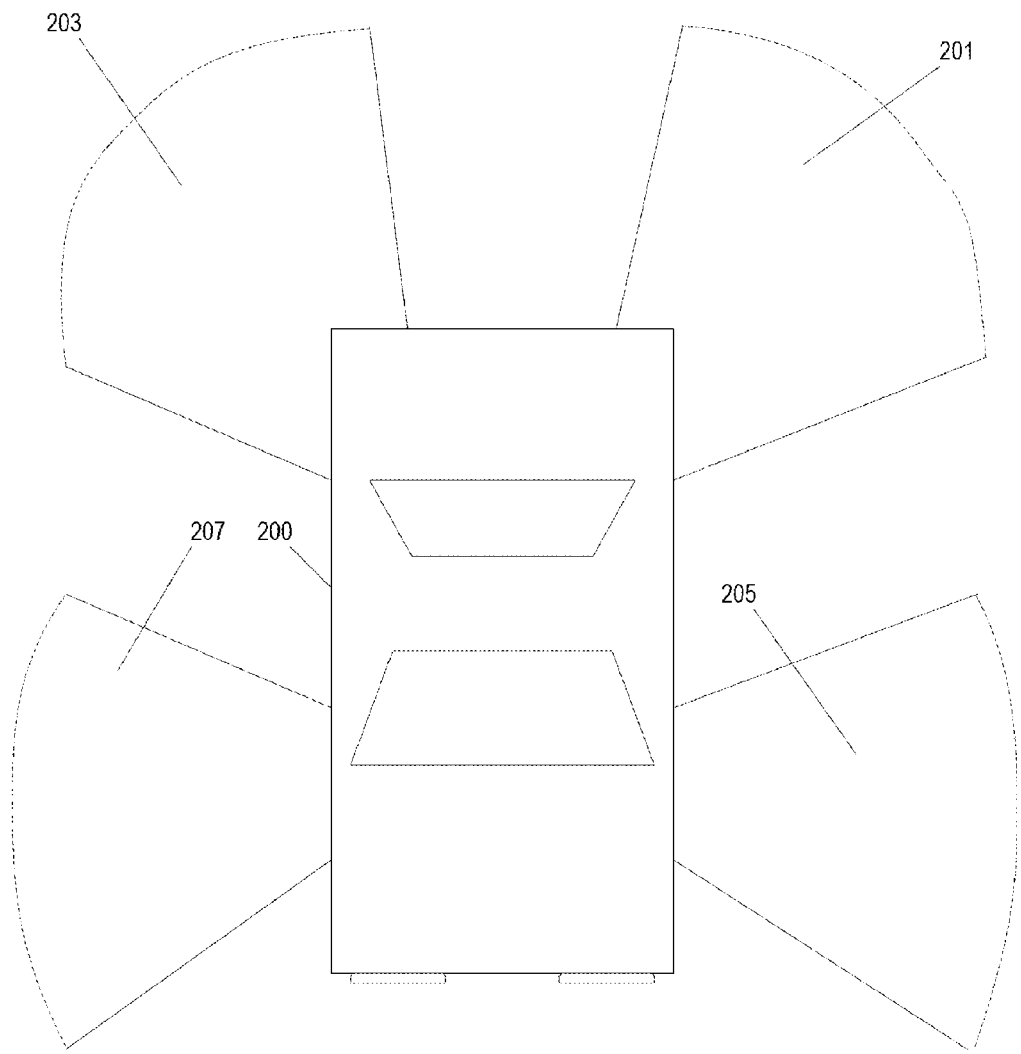
FIG. 2 is an overhead view of a host vehicle illustrating the field of view provided by the sensors in the system of FIG. 1

The sensors 103, 105, 107, and 109 are positioned around a vehicle to provide a field of view. FIG. 2 illustrates the field of view around a vehicle 200 provided by the sensors of the system 100. The left blind spot sensor 103 monitors an area 201 to the left and rear of the vehicle 200. The right blind spot sensor monitors an area 203 to the right and rear of the vehicle 200. The second left sensor 107 monitors an area 205 adjacent to the driver's side of the vehicle 200. The second right sensor 109 monitors an area 207 adjacent to the passenger side of the vehicle 200. The sensors are configured to detect objects in each respective area and to send data indicative of the presence and location of such objects to the control unit 101 of the system 100.

Figure 3:
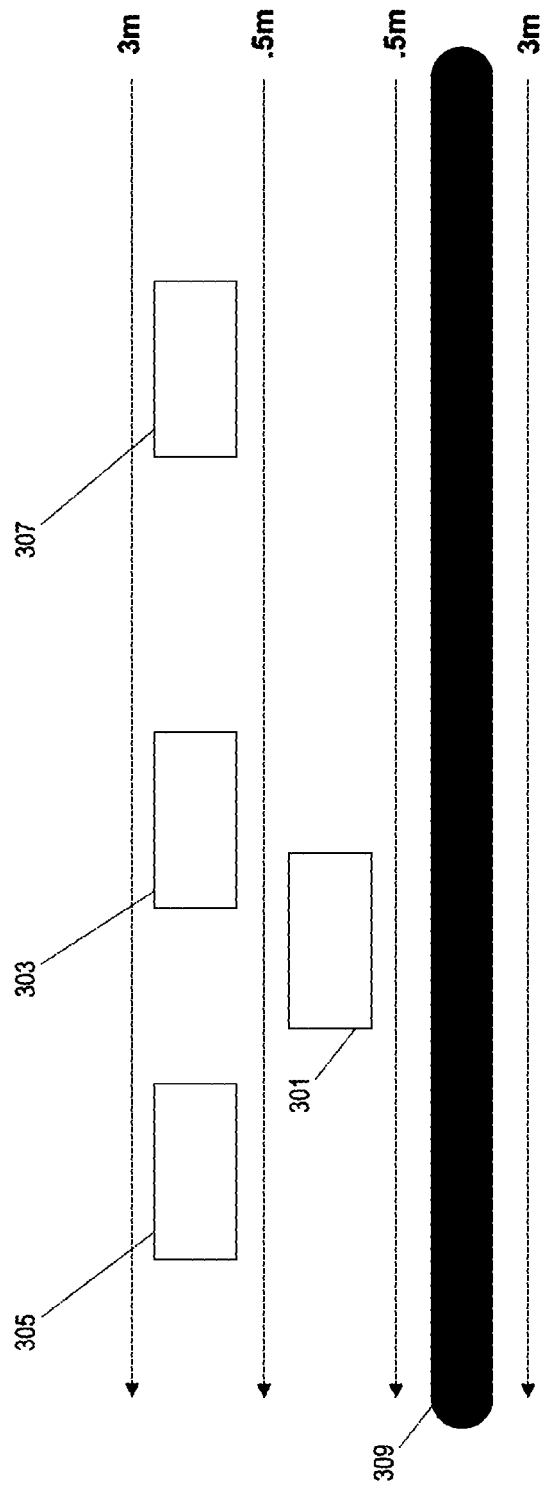
FIG. 3 is a overhead view of the host vehicle including the driver assistance system of FIG. 1 operating on a roadway.

FIG. 3 illustrates a situation in which the driver's assistance system 100 assists the driver of a host vehicle in changing lanes. In FIG. 3, a host vehicle 301 is traveling in the left lane of a roadway. There are three vehicles operating in the right lane—a first vehicle 303 is located in the blind spot of the host vehicle 301, a second vehicle 305 is positioned in front of the first vehicle 303, and a third vehicle 307 is positioned behind the first vehicle 303. To the left of the host vehicle 301 is a guard rail 309 that runs along the length of the roadway.

The first vehicle 303 is stagnating vehicle. It is unlikely that the driver of the host vehicle 301 would be able to see the stagnating vehicle 303 located in its blind spot. Therefore, if the driver of the host vehicle 301 were to attempt to move into the right lane of the roadway behind the second vehicle 305, a collision with the stagnating vehicle 303 might occur.

Figure 4:
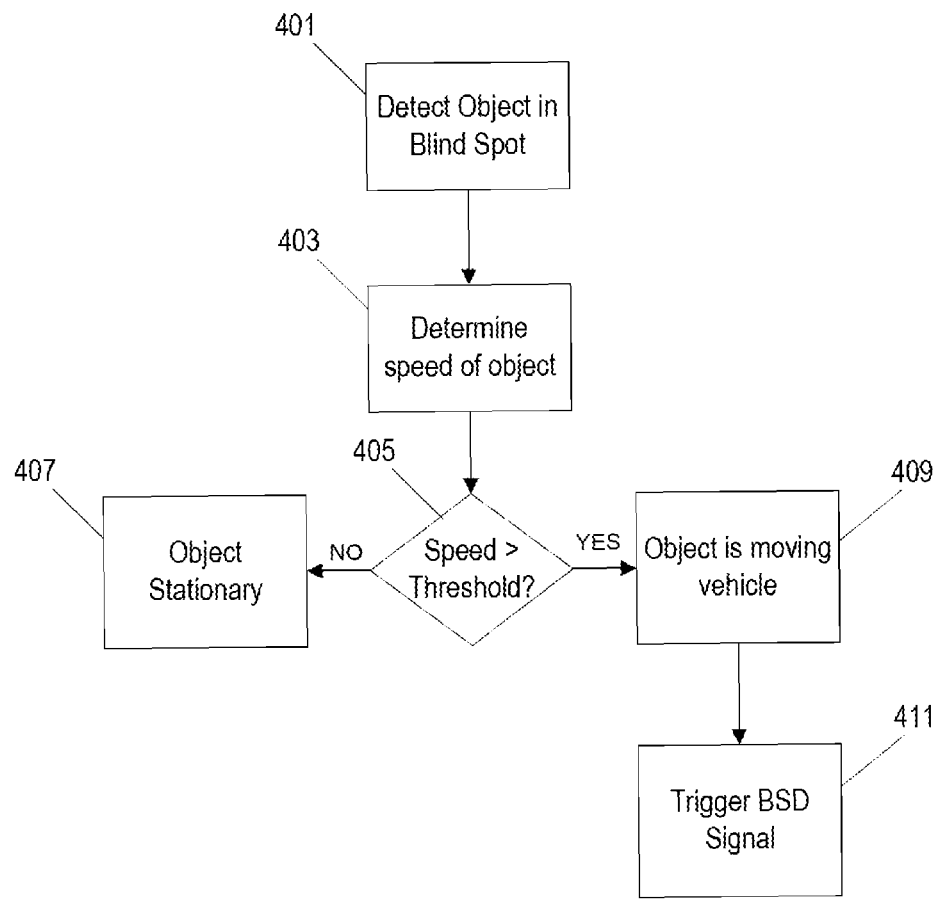
FIG. 4 is a flow chart illustrating a method of distinguishing between a stagnating vehicle and a stationary object using the system of FIG. 1.

FIG. 4 illustrates one method in which the driver's assistance system of FIG. 1 alerts the driver of the host vehicle to the presence of an object in its blind spot. As discussed previously, the various sensors of the host vehicle 303 monitor the blind spots for objects. When an object is detected in the blind spot (step 301), the control unit 101 attempts to determine the actual speed of the object in the blind spot based on data received from the right blind spot sensor 105 (step 403). The actual speed of the object is then compared to a threshold (step 405). In some systems, the threshold is a static value set at the time of manufacture while in other systems the threshold is a value calculated based on the speed of the host vehicle. If the system is able to determine that the actual speed of the object is less than a threshold (step 405), the system determines that it is a stationary object such as a utility pole of a parked vehicle (step 407). The system does not generate a BSD signal. If the system determines that the speed of the object is greater than the threshold (step 405), then the system determines that the object is moving (step 409) and triggers the BSD signal (step 411). As described above, the BSD signal can visually or audibly alert the driver to the presence of the stagnating vehicle. Alternatively or additionally, the system can send the BSD signal to another vehicle system that controls another aspect of the operation of the host vehicle.

However, the method of FIG. 4 will generally only be effective if the system is able to determine that the object in the blind spot is not moving. Some stationary objects that are commonly encountered on roadways, such as guard rails and concrete barriers, are continuous structures and, as such, the objects will remain in the blind spot for a longer period of time. In such situations, the system may not be able to differentiate between a continuous stationary object and a vehicle stagnating in the blind spot of the host vehicle.

For example, in the situation illustrated in FIG. 3, the right blind spot sensor 105 detects the presence of an object 303. The vehicle 303 is operating in the blind spot of the host vehicle 301 at nearly the same speed as the host vehicle 301 (i.e., stagnating). Because the speed of the vehicle 303 relative to the host vehicle is zero, the right blind spot detection sensor 105 cannot distinguish if it is a continuous stationary object (like a guard rail) or a stagnating vehicle based on the method of FIG. 4.

To accurately distinguish between stagnating vehicles and continuous stationary object like the guard rail 309 in FIG. 3, the driver's assistance system analyzes data from the sensors indicative of the behavior of other objects in the same lane as the detected object to determine whether the detected object is stationary or moving. If an object directly in front of or directly behind the detected object is moving, then it is highly likely that the detected object is also moving albeit at nearly the same speed as the host vehicle (i.e., stagnating). Conversely, if an object directly in front of or directly behind the detected object is stationary, then the detected objects is likely a continuous stationary object (e.g. guard rail).

Various techniques can be used to monitor and analyze the objects directly in front of or directly behind an object detected in the blind spot of a host vehicle. For example, a camera system mounted on the side of the vehicle can be configured to visually confirm the presence of a guard rail, such as guard rail 309 in FIG. 3, using image recognition technologies. Furthermore, if the blind spot sensor 105 detects an object in the blind spot for a defined period of time while the second sensor 109 on the side of the vehicle does not detect any object, it can be concluded that the object in the blind spot is not a continuous stationary object, but rather a moving, stagnating vehicle. In another example, the system analyzes data from a global positioning system (GPS) to determine if any known stationary objects are located in the same lane as the object detected in the blind spot. Car2car communication may also be used to determine if an object in the blind spot is a stagnating vehicle or not.

Figure 5:
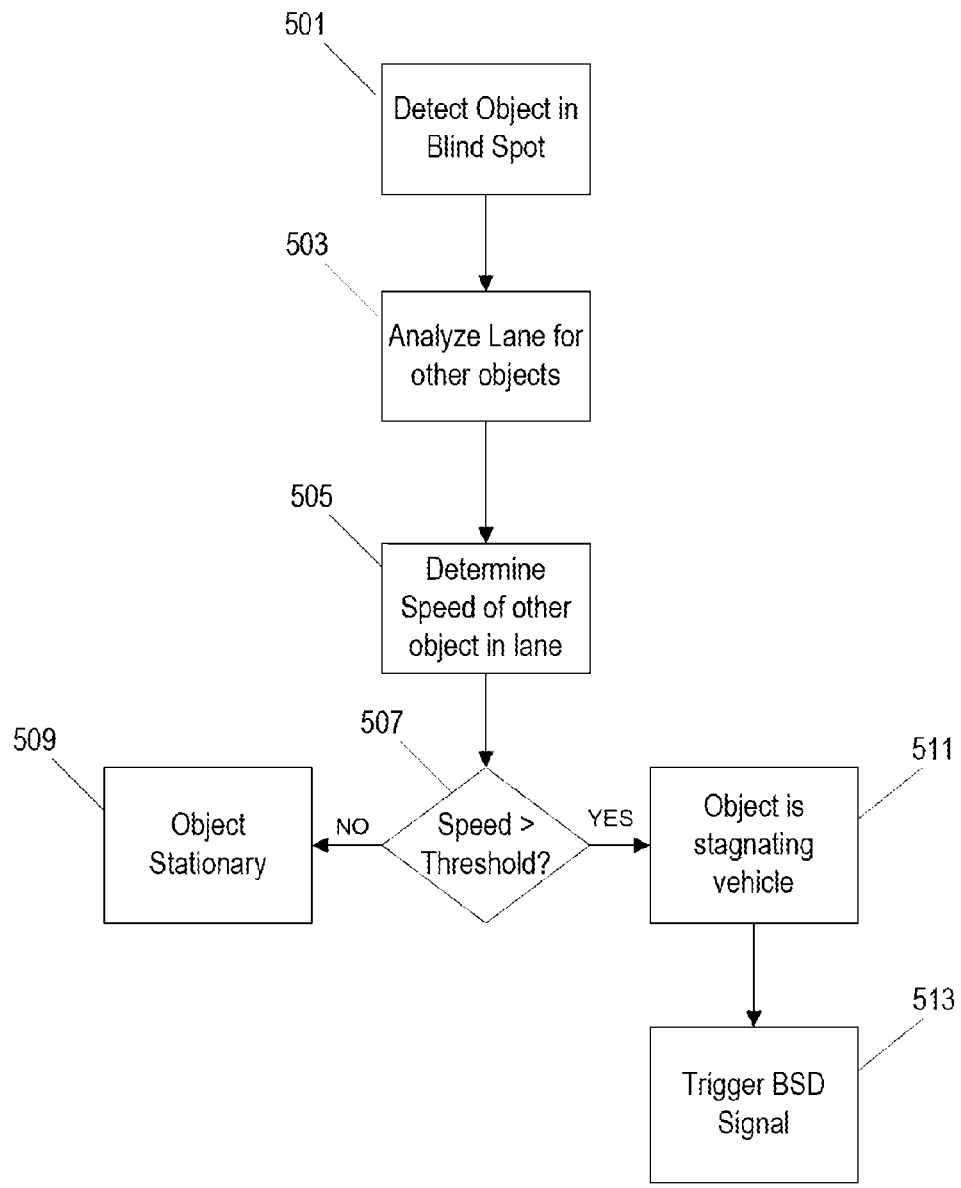
FIG. 5 is a flow chart illustrating a second method of distinguishing between a stagnating vehicle and a stationary object using the system of FIG. 1.

FIG. 5 describes in detail another method of distinguishing between a stationary object and a stagnating vehicle using data indicative of the behavior of objects directly in front of or behind a object detected in the blind spot of the host vehicle. After the system detects an object in the blind spot (step 501), it analyzes additional data from the same sensor and the other sensors to determine if any other objects are located directly in front of or behind (i.e. in the same lane as) the object that has been detected in the blind spot (step 503). The system then determines the speed of the other object(s) in the same lane as the object detected in the blind spot relative to the speed of the host vehicle (step 505). If the speed of the other object(s) in the lane are less than a threshold (step 507), the system determines that the other object(s) and, therefore, the blind spot object are both stationary (step 509). No BSD signal is generated. However, if the speed of the other object(s) is greater than the threshold, the system determines that the other object(s) are moving and, therefore, the object in the blind spot of the host vehicle must be a vehicle moving at the same speed of the host (i.e., stagnating). As such, the object is classified as a stagnating vehicle (step 511) and a BSD signal is triggered (step 513).

In the method of FIG. 5, the system is attempting to determine whether other objects in the same lane as the "blind spot vehicle" (e.g., vehicle 303 in FIG. 3) are moving. Therefore, the threshold will typically be set at or near zero miles per hour. However, in some situations, it is possible that a pedestrian or other object may be moving on the side of the road at a relatively low speed, but greater than zero miles per hour. Therefore, the threshold may be set higher depending upon the speed of the vehicle, the location of the vehicle, or other environmental factors.

The operation of the method of FIG. 5 can be further illustrated in reference to the situation of FIG. 3. In FIG. 3, the right blind spot sensor 105 detects the presence of vehicle 303 in the blind spot. The system then analyzes the data provided by the second right side sensor 109 and detects the presence of the second vehicle 305. The system determines that the second vehicle 305 is moving and, therefore, concludes that the object in the blind spot (vehicle 303) is a stagnating vehicle and not a stationary object. The system could make the same determination by detecting the presence of the third vehicle 307 behind the stagnating vehicle 303 based on the data from the right blind spot sensor 105 and determining that the third vehicle 307 is also moving.

When the left blind spot sensor 103 detects the object 309 in the driver side blind spot, it then analyzes the data from the second left sensor 107 and detects another portion of the same object 309. The system analyzes the data from the second left sensor 107 and determines that the object 309 is stationary, i.e. not moving. Therefore, the part of the object 309 detected by the blind spot sensor 103 is also stationary. Consequently, no blind-spot warning is triggered.

Thus, the invention provides, among other things, a driver assistance system configured to detect an object in the blind spot of a host vehicle, distinguish between a stationary object and a stagnating vehicle, and generate a signal indicating when the detected object is a stagnating vehicle. The systems described above are provided as examples and are not the only methods of implementing the invention. For example, some embodiments may not include the second left sensor and the second right sensor. Instead, the blind spot sensors are positioned to provide a field of view that includes both the blind spot and areas outside of the blind spot. Therefore, other object outside of the blind spot, but in the same lane as the blind spot can be detected and analyzed through the same sensor. Furthermore, although the methods of FIGS. 4 and 5 are described independently, some embodiments will implement both of these algorithms and further additional algorithms to better enable the vehicle system to distinguish between definable stationary objects (e.g., utility poles), continuous stationary object (e.g., guard rails), stagnating vehicles, and vehicles operating speeds different than that of the host vehicle. Various features and advantages of the invention are set forth in the following claims.

What is claimed is:

1. A driver assistance system comprising:
   a first sensor mounted on a host vehicle and positioned with a field of view that includes a blind spot of the host vehicle; and
   a control unit including a processor and a memory, the memory storing instructions that, when executed by the processor, cause the system to
   receive data from the first sensor,
   detect an object in the blind spot of the host vehicle based on the data from the first sensor,
   detect an additional object either in front of or behind the object in the blind spot,
   determine whether the additional object is moving by
   monitoring an amount of time that the object is detected in the blind spot and the additional object is detected outside of the blind spot,
   comparing the amount of time to a threshold, and
   determining that the object in the blind spot and the additional addition object are a single continuous stationary object when the amount of time exceeds the threshold,
   determine that the object in the blind spot is stationary when the additional object is stationary,
   determine that the object in the blind spot is a moving stagnating vehicle when the additional object is moving, and
   trigger a blind-spot-detection signal when the system determines that the object in the blind spot is a moving stagnating vehicle.

2. The driver assistance system of claim 1, further comprising a second sensor mounted on the host vehicle and positioned with a field of view that includes an area outside of the blind spot of the host vehicle.

3. The driver assistance system of claim 2, wherein the first sensor includes a radar sensor and the second sensor includes a video camera.

4. The driver assistance system of claim 2, wherein the first sensor includes a first radar sensor and the second sensor includes a second radar sensor.

5. The driver assistance system of claim 1, wherein the first sensor is positioned with a field of view that includes a first blind spot on a driver side of the host vehicle and further comprising a second sensor positioned with a field of view that includes a second blind spot on a passenger side of the host vehicle.

6. The driver assistance system of claim 5, further comprising a third sensor positioned on the driver side of the host vehicle with a field of view that includes a first area outside of the blind spot on the driver side of the host vehicle and a fourth sensor positioned on the passenger side of the host vehicle with a field of view that includes a second area outside of the blind spot on the passenger side of the host vehicle.

7. The driver assistance system of claim 1, wherein the system is further configured to determine whether the additional object is moving by detecting a speed of the additional object and comparing the detected speed to a threshold.

8. The driver assistance system of claim 1, wherein the system is further configured to determine whether the additional object is moving by
   analyzing a shape of the additional object,
   comparing the analyzed shape to a plurality of shapes associated with known stationary objects, and
   determining that the additional object is stationary when the shape of the additional object is identified as one of the plurality of shapes associated with known stationary objects.

9. The driver assistance system of claim 8, wherein the plurality of shapes associated with known stationary objects includes at least one of a guardrail and a utility pole.

10. The driver assistance system of claim 8, further comprising a video camera system mounted on the vehicle, and wherein the system analyzes the shape of the additional object based on data from the video camera system.

* * * * *